United States Patent
Kumar et al.

(10) Patent No.: US 10,880,689 B2
(45) Date of Patent: Dec. 29, 2020

(54) VISITOR IDENTIFICATION FOR LIGHTING CONTROL

(71) Applicant: SIGNIFY HOLDING B.V., Eindhoven (NL)

(72) Inventors: Rohit Kumar, Hackensack, NJ (US);
Hanuma Teja Maddali, Hyattsville, MD (US); Jasleen Kaur, Melrose, MA (US); Olaitan Philip Olaleye, Wakefield, MA (US); Abhishek Murthy, Arlington, MA (US); Alexandru Darie, Lincoln, MA (US); Talmai Brandao De Oliveira, North Andover, MA (US); Sirisha Rangavajhala, Wakefield, MA (US); Hassan Mohanna, Quincy, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/476,894

(22) PCT Filed: Jan. 9, 2018

(86) PCT No.: PCT/EP2018/050398
§ 371 (c)(1),
(2) Date: Jul. 10, 2019

(87) PCT Pub. No.: WO2018/130500
PCT Pub. Date: Jul. 19, 2018

(65) Prior Publication Data
US 2020/0029170 A1    Jan. 23, 2020

Related U.S. Application Data

(60) Provisional application No. 62/444,949, filed on Jan. 11, 2017.

(30) Foreign Application Priority Data

Jan. 31, 2017 (EP) ................................ 17153869

(51) Int. Cl.
*H04W 4/02* (2018.01)
*H05B 47/19* (2020.01)
*G08G 1/01* (2006.01)

(52) U.S. Cl.
CPC .......... *H04W 4/027* (2013.01); *G08G 1/0129* (2013.01); *H05B 47/19* (2020.01)

(58) Field of Classification Search
CPC ..... H04W 4/027; H05B 47/19; H05B 47/175; G08G 1/0129; G06Q 30/02
(Continued)

(56) References Cited

U.S. PATENT DOCUMENTS

| 8,391,836 B1* | 3/2013 | Bolot | G06Q 30/02 |
| | | | 455/408 |
| 2012/0115475 A1* | 5/2012 | Miyake | G06Q 10/06 |
| | | | 455/435.1 |

(Continued)

FOREIGN PATENT DOCUMENTS

| JP | 2004145657 A | 5/2004 |
| KR | 2015083210 A | 7/2015 |

(Continued)

OTHER PUBLICATIONS

Candia J, et al, "Uncovering individual and Collective Human Dynamics from Mobile Phone Records", Arxiv.org, Cornell University Library, 201 Olin Library Cornell Univ., Ithaca, NY 14853, Oct. 16, 2007, XP080306646, DOI: 10.1088/1751-8113/41/22/224015.

*Primary Examiner* — Anthony S Addy
*Assistant Examiner* — Farid Seyedvosoghi
(74) *Attorney, Agent, or Firm* — Daniel J. Piotrowski

(57) ABSTRACT

The described embodiments relate to systems, methods, and apparatuses for controlling a network of lights (120) accord-
(Continued)

ing to whether people (122) who are observing the lights are visitors from a different location (108). Visitors can be identified by using network connection data (116, 208) that includes entries corresponding to personal devices of visitors to a city. The network connection data can be filtered to identify how many personal devices are associated with people visiting from a different city. If the number of visitors exceeds some threshold relative to non-visitors, a lighting arrangement in the city can be controlled to display features that would appeal to the visitors. The features can correspond to aspects of the city where the visitors are from and can therefore make the city more attractive.

12 Claims, 6 Drawing Sheets

(58) Field of Classification Search
USPC .......................................................... 455/457
See application file for complete search history.

(56) References Cited

U.S. PATENT DOCUMENTS

| 2012/0271834 A1* | 10/2012 | Canora ................. G06Q 30/02 |
| | | 707/748 |
| 2014/0024389 A1 | 1/2014 | Martinez et al. |
| 2016/0078550 A1* | 3/2016 | Smits ..................... G06Q 40/08 |
| | | 705/4 |
| 2016/0286460 A1* | 9/2016 | Shinohara ........... H04W 40/244 |

FOREIGN PATENT DOCUMENTS

| WO | 2015104650 A2 | 7/2015 |
| WO | 2016008774 A1 | 1/2016 |

* cited by examiner

VISITOR IDENTIFICATION FOR LIGHTING CONTROL

CROSS-REFERENCE TO PRIOR APPLICATIONS

This application is the U.S. National Phase application under 35 U.S.C. § 371 of International Application No. PCT/EP2018/050398, filed on Jan. 9, 2018, which claims the benefit of U.S. Provisional Patent Application No. 62/444,949 filed on Jan. 11, 2017 and European Patent Application No. 17153869.7 filed on Jan. 31, 2017. These applications are hereby incorporated by reference herein.

TECHNICAL FIELD

The described embodiments relate to personalized lighting arrangements. More particularly, various embodiments relate to systems, methods, and apparatuses for determining whether a person is a visitor from a location, and controlling a lighting arrangement based on features of the location.

BACKGROUND

Electrical lighting has been used for decades to make certain locations visible and appealing to visitors. Over time, electrical lighting has become programmable to allow for variations in luminance of lights to occur. However, although the programmability of lights can allow them to output more dynamic patterns, oftentimes the dynamic patterns are constantly repeated. Repeated patterns can appear monotonous to people who have seen the dynamic patterns many times before, which can leave people disinterested in the location illuminated by the programmed lights. Furthermore, although lighting patterns can be modified manually to provide more variation, altering the lighting patterns may be inconsequential when there is no way of telling who has seen the lighting pattern already.

U.S. Pat. No. 8,391,836 teaches a system for analyzing call detail records to derive demographic data. The system comprises a processor, a memory, and an application stored in the memory. When executed by the processor, the application analyzes call detail records associated with a base transceiver station to determine statistical information about the subscriber calls within the coverage area and to estimate demographics of people within the coverage area.

SUMMARY

The present disclosure is directed to systems, methods, and apparatuses for controlling a network of lights according to whether a person or a group of people are observing the network of lights is a visitor from another location. In some embodiments, a method is set forth for modifying an operation of a network of lights located in a first location. The method can be performed by a computing device and include steps of receiving historical connection data associated with a personal device of a person located within an area that includes the network of lights, and identifying, using the historical connection data, a second location where the personal device has previously participated in a network connection. The method can also include steps of determining that the person is a visitor to the first location from the second location based on the identifying of the second location, and causing the network of lights to perform a lighting operation that is based on a feature of the second location.

In other embodiments, a computing device is set forth. The computing device can include one or more processors, and a memory configured to store instructions that when executed by the one or more processors, cause the one or more processors to perform steps that include receiving call record data corresponding to personal devices associated with people located in a first location that is within a visible range of a network of lights. The steps can also include filtering the call record data based on a number of times that a second location is identified in the call record data, and determining that a portion of the people are visitors from the second location. The steps can further include causing the network of lights to exhibit a lighting pattern that is based on a feature of the second location.

In yet other embodiments, a system is set forth that includes a computing device configured to use network data to identify a number of personal devices that have been located in a first location and filter the network data to identify personal devices that have previously been located in a second location. The system can also include a lighting controller communicatively coupled to the computing device, the lighting controller configured to generate instructions for providing a lighting arrangement that is based on information about the second location. The system can further include a network of lights communicatively coupled to the lighting controller, the network of lights configured to receive the instructions and output the lighting arrangement.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
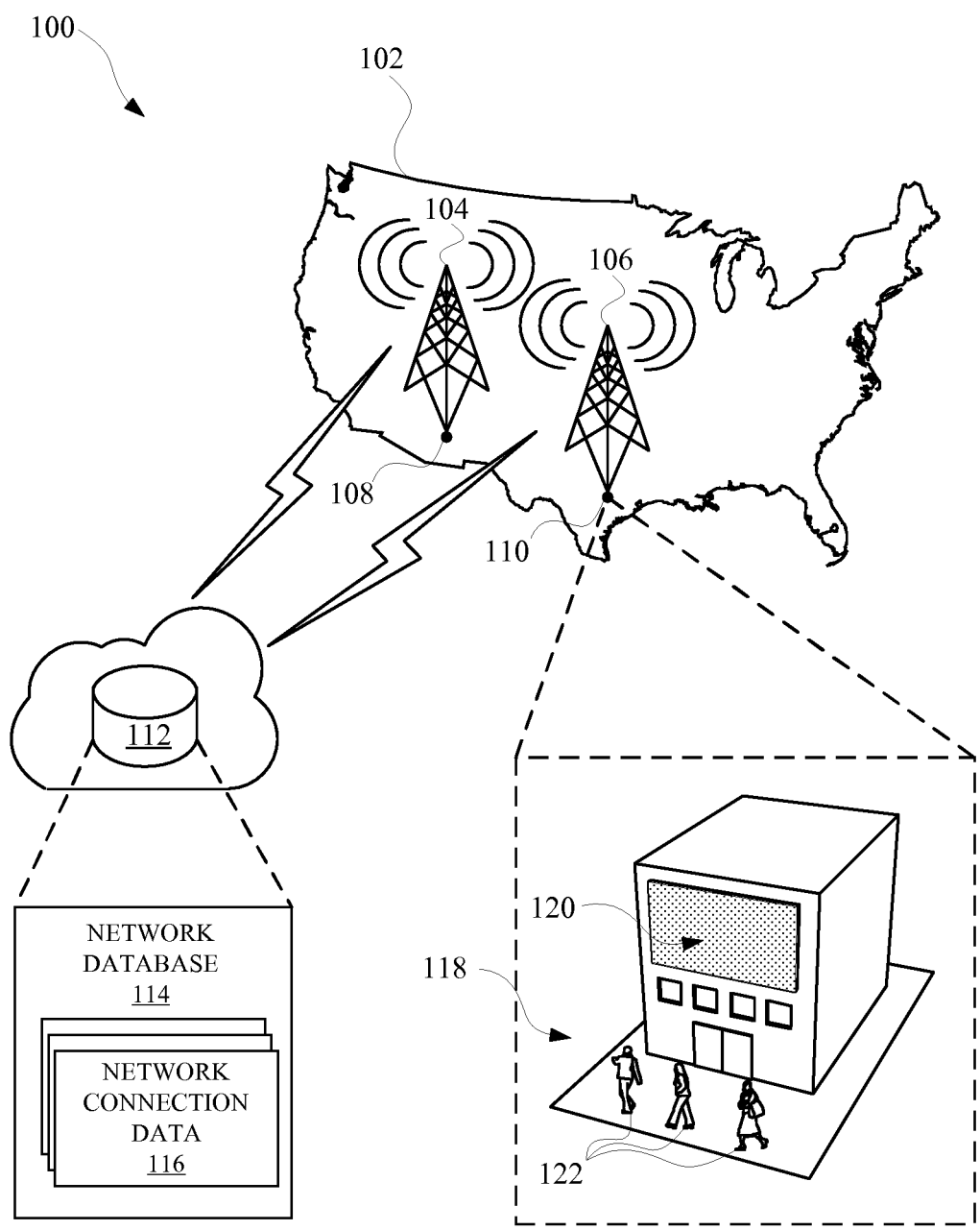
FIG. 1 illustrates a diagram of a network of lights that provide an output based on network connection data associated with visitors to an area that includes the network of lights.

City lighting can be used to attract visitors to various areas of a city. Specifically, lighting that is designed to illuminate city centers and monuments can attract visitors by exhibiting different creative lighting arrangements. Many lighting arrangements can be perpetual or programmed only to vary by time of day, which can be uninteresting to visitors of a city. The embodiments described herein relate to a lighting system that can use data related to city residents and visitors to vary lighting arrangements across a city. Data can be collected from various sources in order that the lighting system can use the data to characterize people of a city in terms of whether they are visitors or locals. Additionally, the lighting system can use the data to determine the number of people visiting a city or a portion of a city. The sources of the data can include call data records (CDRs) from telecommunication providers, social media data, public traffic data, and/or any other source of data suitable for indicating where a person has traveled from. CDRs can detail communications made from a personal device of a person visiting a city. A CDR can contain a call start time, a duration of the call, a status of the call, a source number or source device identifier, and/or a destination number or destination device identifier. The CDR can also include a time stamped location of one or more cell towers or network devices used to connect a call, and a unique identifier for identifying the source device that initiated or received the call.

Once data has been collected and analyzed, the lighting system can direct a lighting controller to display a lighting arrangement that is based on the collected data. For example, the lighting arrangement can be related to places where visitors to the city have traveled from. Furthermore, the lighting arrangements can be modified for returning visitors that have already seen certain lighting arrangements, in order that the visitors will see a different lighting arrangement each time they visit. The CDRs and other data can be used to aggregate statistics on the impact of lighting arrangements on the number of visitors and/or the types of visitors.

The lighting system can be operated by at least one computing device that is programmed to analyze the data and provide instructions to a lighting controller for controlling the lights in different areas of a city. For example, the computing device can receive sensor data from one or more sensors throughout a city and analyze the sensor data to determine the number of people viewing a lighting arrangement. The computing device can also receive the data related to the people viewing the lighting arrangement to determine whether the people are visitors or locals. In this way, lighting arrangements can be sustained or modified according to the number of people viewing the lighting arrangements, where one or more visitors are visiting from, and/or whether the people are returning visitors.

The computing device can include an analytical engine for analyzing the various data related to the people viewing various lighting arrangements. The analytical engine can filter the data, such as CDRs, by location in order to identify the people or devices that are located near a lighting arrangement or other landmark such as a monument. Once the data has been filtered, the filtered data can be analyzed to identify locations where those people have been located within a specified time period. For example, locations of cell towers that a personal device has connected to in the specified time period can be identified in the filtered data. If the locations of the cell towers are outside of the city, then the personal device can be designated as being associated with a visitor. If the locations of the cell towers are in or near the city, the personal device can be designated as being associated with a local. If at least a threshold number of visitors or a percentage of people in an area are visitors, the analytical engine can cause a lighting controller to illuminate a network of lights in a manner that relates to a location where the visitors are from. Social media can also be used as an input to the analytical engine in order to find relevant information for developing a lighting arrangement for one or more persons. The social media data can also be used to identify contacts of different people in order to see friends and family of those people, for further identifying appealing lighting arrangements.

FIG. 1 illustrates a diagram 100 of a network of lights 120 that provide an output based on network connection data 116 associated with visitors 122 to an area 118 that includes the network of lights 120. Network connection data 116 can be stored at a network database 114 on a storage device 112 operated by a network provider. The network connection data 116 can include data related to the personal devices of the visitors 122 and the network connections in which the personal devices have participated. For example, the visitors 122 can be from a first location 108 of a region 102, such as the United States. The first location 108 can include a cell tower 104 that effectuates cellular calls or other transmissions from the personal devices. When a visitor 122 is located in the first location 108 and places a call using their personal device, the personal device can connect to the cell tower 104. As a result, the network connection data 116 can be created or modified at the network database 114 to include information that identifies the first location 108, the cell tower 104, the personal device, times that the call began and finished, and/or a destination for the call. If the visitors 122 is from the first location 108 and frequently participates in calls at the first location 108, then there will be numerous entries in the network connection data 116 that correlates the personal device of the visitor 122 with the first location 108. Furthermore, when the visitor 122 visits a second location 110 and uses their personal device to make calls, a second cell tower 106 at the second location 110 can be identified in the entries of the network connection data 116.

When a visitor 122 visits the second location 110 and moves through an area 118 having a network of lights 120, an output of the network of lights 120 can be modified according to information that is included in the entries of the network connection data 116. The network of lights 120 can be in communication with a lighting system that can access the network connection data 116 and cause the network of lights 120 to change operation based on the network connection data 116. By accessing the network connection data 116, the lighting system is able to determine where visitors 122 are traveling from by filtering the network connection data 116 according to the frequency of locations provided in the entries of the network connection data 116. When a threshold number of people or portion of people in the area 118 are identified as being visitors 122 from the first location 108, the lighting system can cause the network of lights 120 to display a lighting arrangement related to the first location 108. For example, the network of lights 120 can display images having a context defined by the first location 108. The context can include a sports team of the first location 108, a landmark of the first location 108, a historical aspect of the first location 108, and/or any other feature of the first location 108 that can be characterized by a lighting arrangement.

Furthermore, the network connection data 116 can indicate whether a person is a returning visitor 122 to the second location 110 by filtering the network connection data 116 according to identified locations in the network connection data 116. The lighting system can determine that returning visitors 122 are in the area 118 and cause the network of lights 120 to provide a lighting arrangement that is different than the light arrangement the visitors 122 may have seen during previous visits to the second location 110. Furthermore, social media data related to the visitors 122 can be accessed to identify other contexts for creating lighting arrangements that would be interesting to the visitors 122. A feedback loop can be incorporated into the lighting system to help the lighting system establish lighting arrangements that have resulted in visitors 122 returning to or staying in a particular area 118 of the second location 110. Feedback can be based on the network connection data 116 available to the lighting system, social media data that relates to the second location 110, sensor data from sensors that are located in the second location 110, and/or any other source of data suitable for describing a response of the visitors to a lighting arrangement. Furthermore, when a visitor 122 returns to the first location 108 after visiting the second location 110, another network of lights at the first location 108 can provide a lighting arrangement related to the second location 110.

Figure 2:
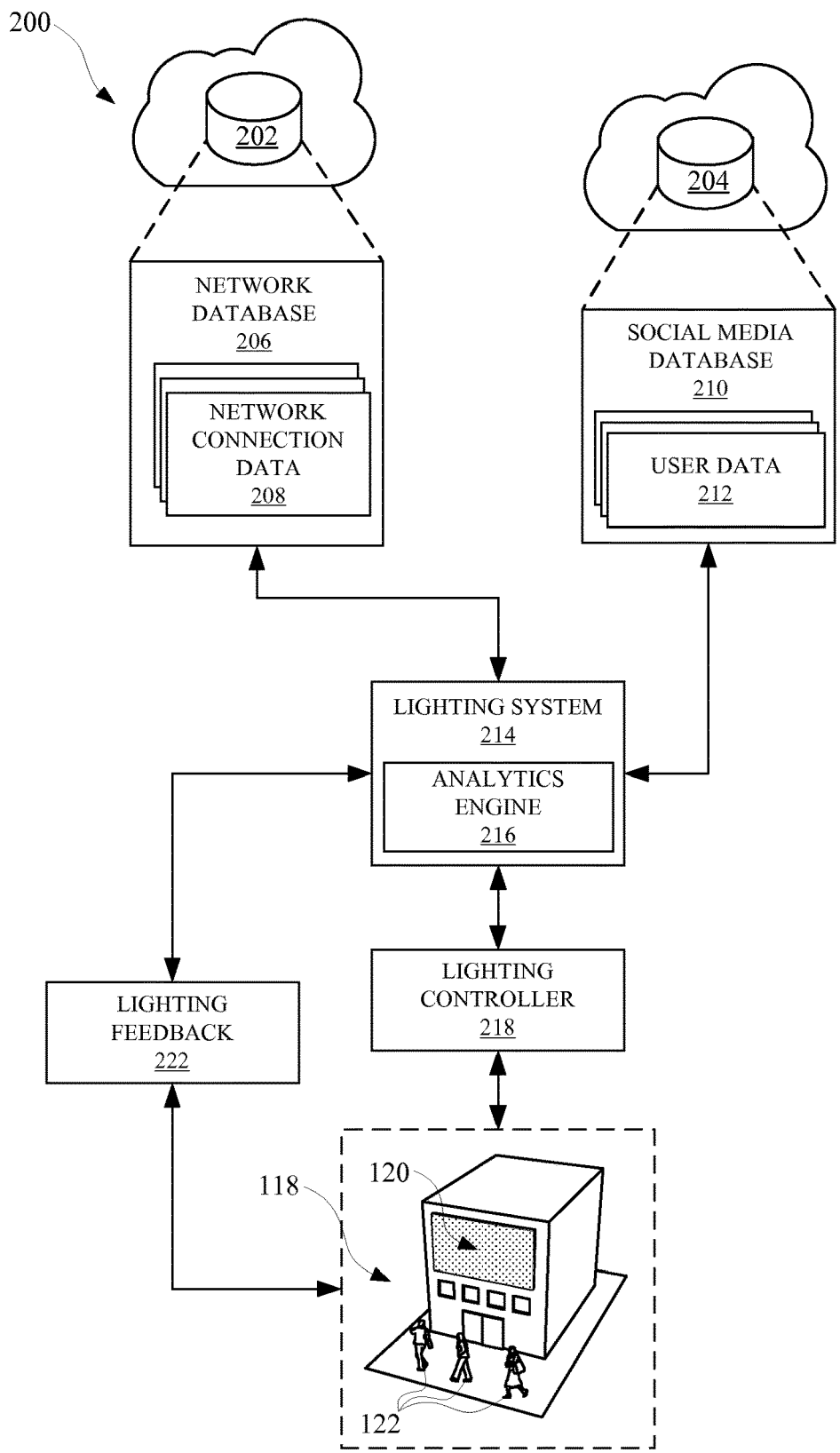
FIG. 2 illustrates a system for controlling the network of lights according to data provided by an analytics engine of a lighting system.

FIG. 2 illustrates a system 200 for controlling the network of lights 120 according to data provided by an analytics engine 216 of a lighting system 214. The system 200 can include a first computing device 202 that hosts a network database 206 that manages network connection data 208 associated with multiple different devices. Optionally, the system 200 can include a second computing device 204 that includes a social medial database 210 that manages user data 212 associated with multiple different social media account of users. Each of the first computing device 202 and the second computing device 204 can communicate with the lighting system 214 over a private or public network (e.g., the internet).

The lighting system 214 can be a computing device that includes an analytics engine 216, which can be embodied as software operating on the computing device. The analytics engine 216 can analyze the network connection data 208 and/or the user data 212 to determine how to operate the network of lights 120. When determining how to operate the network of lights 120, the analytics engine 216 can first determine who is near the area 118 by accessing and filtering the network connection data 208. The network connection data 208 can be filtered to identify the personal devices that have participated in network connections near the area 118 within a threshold period of time. For example, the threshold period of time could be less than a day, or at least a day. However, it should be noted that the threshold period can be any time suitable for determining that a personal device is associated with a visitor to the area 118. In some embodiments, the threshold period can be based on the area 118, and therefore different areas of a city or location can have different threshold periods from which to determine who is a visitor to the area. For example, a residential area can have a first threshold period and a commercial area can have a second threshold period that is shorter than the first threshold period.

After the analytics engine 216 has filtered the network connection data 208, the analytics engine 216 can further filter or identify a proportion of the network connection data 208 that is associated with a personal device that is from a different area. The analytics engine 216 can identify personal devices from a different area by identifying entries in the network connection data 208 that correlate personal devices to the different area. For example, if the entries indicate that a personal device has participated in a network connection at a different area for more than a threshold period (e.g., a month or any other time period), the personal device can be designated as being associated with a person from a different area. If there are multiple people from the different area, the analytics engine 216 can determine a proportion of people in the area 118 that are from the different area. If the proportion is above a threshold proportion (e.g., at least 1%, 5%, or any other proportion or percentage), the analytics engine 216 can select the different area as being a basis for controlling the network of lights 120. For example, the lighting system 214 can identify features of the different area such as landmarks, sports teams, universities, and/or any other features to create a lighting arrangement for the network of lights 120. In some embodiments, a lighting controller 218 can store instructions for creating different lighting arrangements. The lighting controller 218 can use an output of the analytics engine 216 to identify the appropriate lighting arrangement, or create a new lighting arrangement. The lighting arrangement can be based on the geographic location identified by the analytics engine 216 using the filtered network connection data 208.

In some embodiments, the analytics engine 216 can cause the lighting controller 218 to employ a lighting arrangement at the network of lights 120 that advertises a different area of the city in which the network of lights 120 is located. For example, the analytics engine 216 can determine that a proportion of the visitors 122 are from another city that is different than the city that the network of lights 120 is located. Furthermore, the analytics engine 216 can cause the lighting controller 218 to output a lighting arrangement at the network of lights 120 based on the other city. However, the analytics engine 216 can also cause the lighting controller 218 to output a lighting arrangement that advertises a separate area of the city that other visitors 122 are interested in going to according to user data 212 from the social medial database 210. In other words, after filtering the network connection data 208, the analytics engine 216 can identify persons in the filtered network connection data and use their social media data to bring them together in person. For example, if the visitors 122 are from another city that has a sports team that is playing a game near the network of lights 120, some of the visitors 122 may already be planning on going to the game according to the user data 212. The network of lights 120 can then advertise the game to other visitors 122 who may not have been planning on going to the game, in order to encourage all the visitors 122 to meet in a common location (e.g., the game). Should many of the visitors 122 go to an advertised location in response to seeing a lighting arrangement at the network of lights 120, feedback can be provided to the lighting system 214 to designate the lighting arrangement as a useful arrangement. If the visitors 122 do not go to an advertised location in response to seeing the lighting arrangement, feedback can be provided to the lighting system 214 to designate the lighting arrangement as not being useful. In some embodiments, devices such as sensors or other apparatuses can be used to provide lighting feedback 222. The lighting feedback 222 can be used to ensure that the lighting arrangement suggested by the analytics engine 216 is displayed accurately at the network of lights 120.

Figure 3:
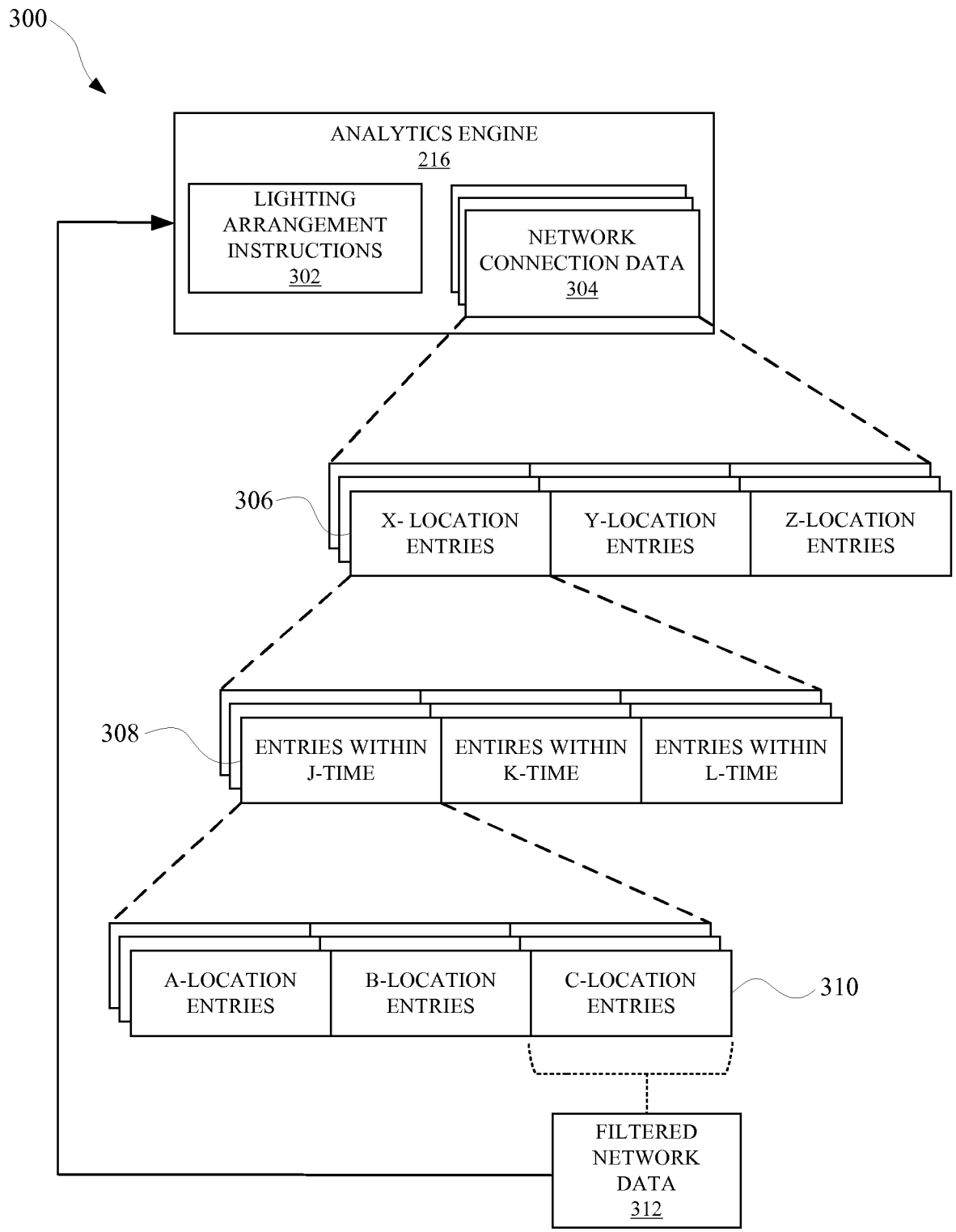
FIG. 3 illustrates a diagram that shows how the analytics engine can create lighting arrangement instructions from filtered network data.

FIG. 3 illustrates a diagram 300 that shows how the analytics engine 216 can create lighting arrangement instructions 302 from filtered network data 312. The analytics engine 216 can receive network connection data from a database over a network connection, as discussed herein. The received network connection data 304 can include data related to personal devices of people in an area of a city. The data can include call data records that provide details regarding the network connections that the personal devices have participated in. For example, the data can include entries that identify the locations of where the personal devices were located while participating in the network connections. Once the analytics engine 216 has received the network connection data 304, the analytics engine 216 can filter the network connection data 304 according to one or more different parameters. For example, initially the network connection data 304 can include data related to personal devices that are located in the same city as a lighting arrangement and a different city than the lighting arrangement. In order to identify those personal devices that are located in the same city (e.g., x-location) as the lighting arrangement, the analytics engine 216 can filter the network connection data 304 according to those entries that include x-location entries 306. The x-location can refer to an entry that identifies a cell tower or other network device that a personal device has been connected to while in the x-location.

Once the x-location entries have been filtered from the network connection data 304, the filtered network connection data 304 can be further filtered according to entries that include the x-location within a threshold time period (e.g., J-time, where J-time is any suitable time period such as hours, days, and/or weeks). In this way, the analytics engine 216 can use the entries within J-time 308 to identify the personal devices that have participated in a network connection near the x-location within a threshold time period, J-time. Once those personal devices have been identified, the remaining network connection data 304 can be further filtered to identify locations where a portion of the people, associated with the personal devices, have traveled from. For example, a portion of the people can be travelers from a c-location, and therefore the network connection data 304 can include c-location entries. The network connection data 304 can include c-location entries because the people have participated in network connections in the c-location, which can be outside of the x-location. The remaining network connection data 304 after filtering can be filtered network data 312, which can be used by the analytics engine 216 to create lighting arrangement instructions 302. The filtered network data 312 can identify personal devices of people that have traveled from c-location to x-location, and have been in the x-location within a threshold period of time, J-time. In order to create a suitable lighting arrangement for the visitors from c-location, the analytics engine 216 can identify features of c-location using location feature data available to the analytics engine 216. The location feature data can be accessed over a network or stored at a computing device that is operating the analytics engine 216. The resulting lighting arrangement can then be created from lighting arrangement instructions 302 that are based on the location feature data.

Figure 4:
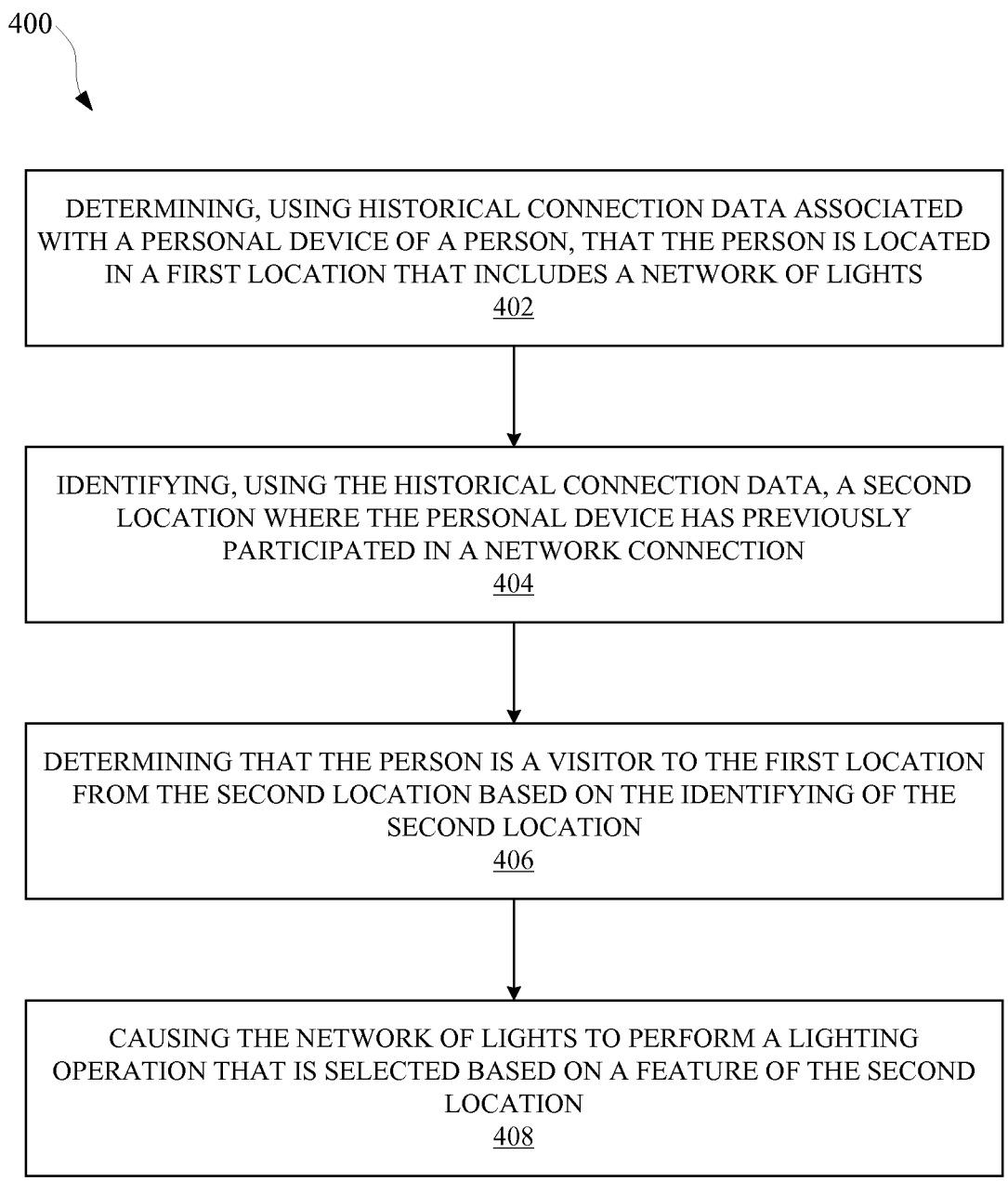
FIG. 4 illustrates a method for controlling a network of lights based on historical network connection data.

FIG. 4 illustrates a method 400 for controlling a network of lights based on historical network connection data. The method 400 can be performed by the lighting system 214, analytics engine 216, lighting controller 218, and/or any other device or apparatus suitable for analyzing connection data. The method 400 can include a block 402 of determining, using historical connection data associated with a personal device of a person, that the person is located in a first location that includes a network of lights. The historical connection data can include call record data, and/or any other data that includes information related to locations where the personal device has connected to a network of devices. The method 400 can further include a block 404 of identifying, using the historical connection data, a second location where the personal device has previously participated in a network connection. Each of the first location and the second location can be identified in entries of the historical connection data, and the entries can be based on a location of cell towers or other network devices that the personal device has connected to. The method 400 can also include a block 406 of determining that the person is a visitor to the first location from the second location based on the identifying of the second location. Determining that the person is a visitor from the second location can be based on the number of times that the second location appears in the historical connection data and/or when the second location appears in the historical connection data. The method 400 can further include a block 408 of causing the network of lights to perform a lighting operation that is based on a feature of the second location. The feature can include a landmark, logo, person, mascot, and/or other feature that would remind a person of the second location.

Figure 5:
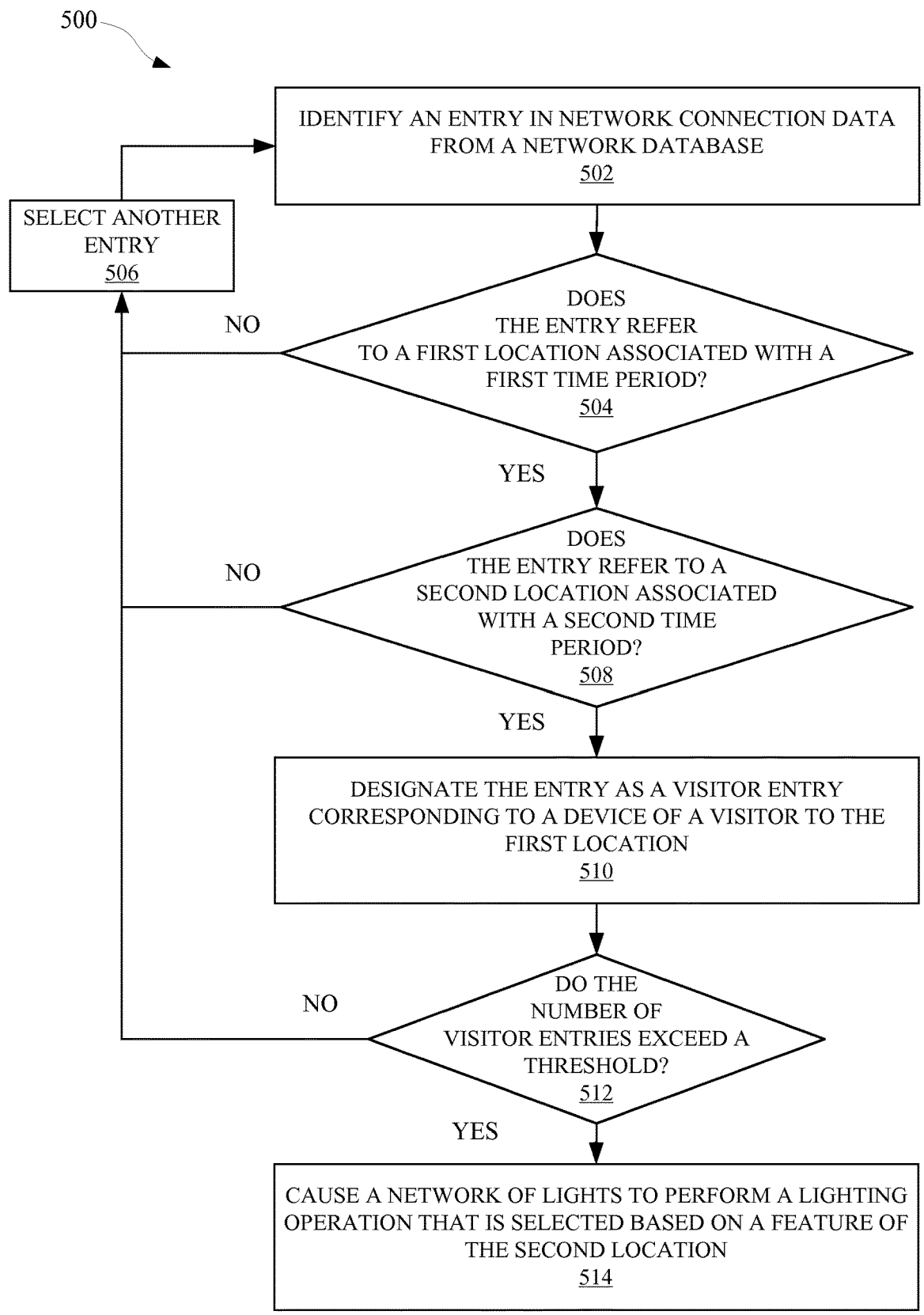
FIG. 5 illustrates a method for controlling a network of lights based on how many visitors are traveling to a location.

FIG. 5 illustrates a method 500 for controlling a network of lights based on how many visitors are traveling to a location. The method 500 can be performed by the lighting system 214, analytics engine 216, lighting controller 218, and/or any other device or apparatus suitable for analyzing connection data. The method 500 can include a block 502 of identifying an entry in network connection data from a network database. The network connection data can include call records and/or other data related to network connections that a computing device participated in. At block 504, a determination is made whether the entry refers to a first location associated with a first time period. The first location can be a location that includes or is proximate to the network of lights and the first time period can be a range from the present time to a past time. If the entry does not refer to the first location, then a different entry can be selected at block 506 and the method 500 can begin again at block 502 with the different entry. If the entry does refer to the first location, then, at block 508, a determination can be made whether the entry refers to a second location associated with a second period of time. For example, the entry can include an identifier for the second location and a time stamp that associates the second location with a second time period. The second location can be a region that is separate from the first location and the second time period can be the same or different than the first time period. For example, the first time period can refer to a shorter range of time than the second time period. If the entry does not refer to a second location that is associated with a second time period, then a different entry can be selected at block 506 and the method 500 can begin again. If the entry does refer to a second location associated with a second time period, then, at block 510, the entry can be designated as a visitor entry that corresponds to a device of a visitor to the first location. At block 512, a determination is made whether the number of visitor entries has exceeded a threshold. In some embodiments, the determination includes comparing a portion of entries that are visitor entries to a portion of entries that are not visitor entries. In this way, it can be determined what portion of people in the first location are visitors from the second location or another location. If the number of visitor entries does not exceed the threshold, then, at block 506, another entry can be selected and the method 500 can begin again. If the number of entries does exceed the threshold, then, at block 514, the network of lights is caused to perform a lighting operation that is based on a feature of the second location.

Figure 6:
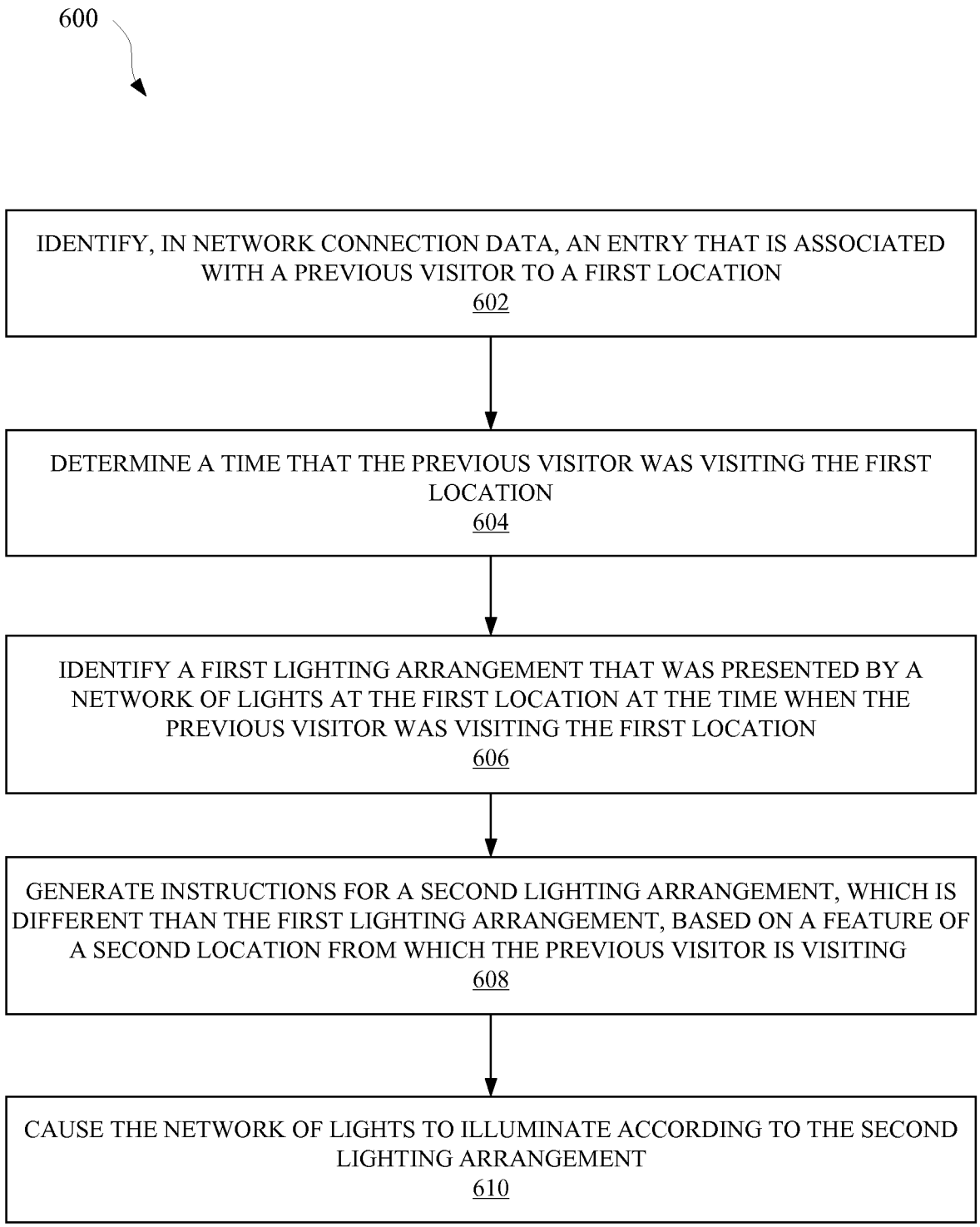
FIG. 6 illustrates a method for changing lighting arrangements according to whether a person is a returning visitor to a location.

FIG. 6 illustrates a method 600 for changing lighting arrangements according to whether a person is a returning visitor to a location. The method 600 can be performed by the lighting system 214, analytics engine 216, lighting controller 218, and/or any other device or apparatus suitable for analyzing connection data. The method 600 can include a block 602 of identifying, in network connection data, an entry that is associated with a previous visitor to a first location. The network connection data can include call records and/or other data related to network connections that a computing device participated in. The method 600 can also include a block 604 of determining a time that the previous visitor was visiting the first location. Furthermore, the method 600 can include a block 606 of identifying a first lighting arrangement that was presented by a network of lights at the first location at the time when the previous visitor was visiting the first location. Each lighting arrangement can be associated with stored instructions for a lighting control system and the stored instructions can be time stamped according to when they were executed by the lighting control system. The method 600 can further include a block 608 of generating instructions for a second lighting arrangement, which is different than the first lighting arrangement, based on a feature of a second location from which the previous visitor is visiting. At block 610, the network of lights can be caused to illuminate according to the second lighting arrangement.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method for modifying an operation of a network of lights located in a first location, the method comprising:
   by a computing device:
   receiving historical connection data associated with a personal device of a person located within an area that includes the network of lights;
   determining whether the person is a local to the first location or a visitor to the first location from a second location based on the historical connection data;
   identifying, using the historical connection data, the second location;
   identifying one or more features of the second location;
   causing the network of lights to perform a lighting operation that is based on whether the person is a local or a visitor to the first location and if the person is a visitor, using a feature of the second location to perform the lighting operation;
   receiving media data related to the second location, wherein the feature of the second location is identified using the media data; and
   wherein the lighting operation causes the network of lights to exhibit a dynamic lighting pattern, that includes an image of the feature of the second location and the image is a landmark that is located in the second location and identified in the media data, and is based on a threshold number of persons from the second location and the one or more features of the second location.

2. The method of claim 1, wherein the historical connection data corresponds to a call data record and the first and second locations are associated with respective cell towers that the personal device was connected to.

3. The method of claim 1, further comprising:
   receiving sensor data from a sensor that is responsive to a change in a number of persons visiting the first location; and
   determining, using the sensor data, that the number of persons visiting the first location changed after the network of lights performed the lighting operation.

4. A computing device, comprising:
   one or more processors; and
   a memory configured to store instructions that when executed by the one or more processors, cause the one or more processors to perform steps that include:
   receiving call record data corresponding to personal devices associated with people located in a first location that is within a visible range of a network of lights;

filtering the call record data based on a number of times that a second location is identified in the call record data;
determining that a portion of the people are visitors from the second location;
identifying one or more features of the second location; and
causing the network of lights to exhibit a lighting pattern that is based on a threshold number of persons from the second location and the one or more features of the second location;
receiving media data related to the second location, wherein the feature of the second location is identified using the media data; and
wherein the lighting operation causes the network of lights to exhibit a dynamic lighting pattern that includes an image of the feature of the second location and the image is a landmark that is located in the second location and identified in the media data.

5. The computing device of claim 4, wherein filtering the call record data includes:
determining that the second location is identified in the call record data within a threshold period of time.

6. The computing device of claim 4, wherein the steps further include:
receiving social media data associated with a personal device of the personal devices, wherein the lighting pattern is further based on the social media data.

7. The computing device of claim 4, wherein the steps further include:
determining the visible range of the network of lights; and
accessing a call record database that includes call record data corresponding to other personal devices of other people located outside of the first location.

8. The computing device of claim 4, further comprising:
determining that the portion of the people who are visitors from the second location has decreased after the network of lights exhibited the lighting pattern; and
modifying instructions corresponding to the lighting pattern.

9. A system, comprising:
a computing device configured to use network data to identify a number of personal devices that have been located in a first location and filter the network data to identify personal devices that have previously been located in a second location;
a lighting controller communicatively coupled to the computing device, the lighting controller configured to identify one or more features of the second location area using media data related to the second location, wherein the feature of the second location is identified using the media data; generate instructions for providing a lighting arrangement that is based on the one or more features of about the second location if a threshold number of personal devices that have previously been located in the second location are identified and the one or more features of the second location; and
a network of lights communicatively coupled to the lighting controller, the network of lights configured to receive the instructions and output the lighting arrangement; and
wherein the instructions causes the network of lights to exhibit a dynamic lighting pattern that includes an image of the feature of the second location and the image is a landmark that is located in the second location and identified in the media data.

10. The system of claim 9, wherein the network data includes time-stamped location data and the computing device is further configured to filter the network data to identify the personal devices that have participated in a network connection in the first location within a threshold period of time.

11. The system of claim 9, wherein the lighting arrangement is based on a demographic of persons associated with the personal devices.

12. The system of claim 9, wherein the computing device is further configured to receive feedback regarding whether the personal devices are associated with returning visitors to the first location.

* * * * *